(12) United States Patent
Wießmann et al.

(10) Patent No.: US 12,081,071 B2
(45) Date of Patent: Sep. 3, 2024

(54) ELECTRIC MOTOR AND PUMP COMPRISING SUCH AN ELECTRIC MOTOR

(71) Applicant: Brose Fahrzeugteile SE & Co. Kommanditgesellschaft, Würzburg, Würzburg (DE)

(72) Inventors: Nico Wießmann, Kitzingen (DE); Peter Sudermann, Schwarzenau (DE); Stephan Roos, Wertheim-Höhefeld (DE); Alexander Volkamer, Oberscheinfeld (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 515 days.

(21) Appl. No.: 17/261,798

(22) PCT Filed: Jul. 2, 2019

(86) PCT No.: PCT/EP2019/067677
§ 371 (c)(1),
(2) Date: Jan. 20, 2021

(87) PCT Pub. No.: WO2020/015999
PCT Pub. Date: Jan. 23, 2020

(65) Prior Publication Data
US 2021/0265878 A1    Aug. 26, 2021

(30) Foreign Application Priority Data

Jul. 20, 2018    (DE) ..................... 10 2018 212 145.1

(51) Int. Cl.
*H02K 1/18*        (2006.01)
*B60R 17/02*       (2006.01)
(Continued)

(52) U.S. Cl.
CPC ............. *H02K 1/185* (2013.01); *B60R 17/02* (2013.01); *F04D 13/06* (2013.01); *F04D 29/18* (2013.01); *F16B 25/0036* (2013.01); *H02K 21/16* (2013.01)

(58) Field of Classification Search
CPC .......... H02K 1/185; H02K 5/15; H02K 5/225; H02K 15/14; B60R 17/02; F04D 13/06; F04D 29/18; F16B 25/0036
See application file for complete search history.

(56) References Cited

U.S. PATENT DOCUMENTS

| 3,473,475 | A |   | 10/1969 | Martini et al. |
| 3,966,363 | A | * | 6/1976  | Rowley ................... F04D 13/06 |
|           |   |   |         | 415/174.3 |

(Continued)

FOREIGN PATENT DOCUMENTS

| CN | 1360667 A  | 7/2002 |
| CN | 107645218 A | 1/2018 |

(Continued)

OTHER PUBLICATIONS

Chinese Office Action for CN 201980047048.9 Dated Oct. 12, 2023, Google English Machine Translation attached to original, All together 12 Pages.

(Continued)

*Primary Examiner* — Dominick L Plakkoottam
(74) *Attorney, Agent, or Firm* — Dickinson Wright PLLC

(57) ABSTRACT

An electric motor, in particular for an oil pump, comprising a rotor and a stator, wherein the stator has through-openings, which are continuous in the axial direction, for screw elements, and comprising a functional support, which is arranged on an end face with respect to the axial direction of the stator and which has a contoured contact section for the stator and screw receiving areas for the screw elements. The screw receiving areas protrude out of the contoured contact (Continued)

section for the stator in the axial direction, and the screw receiving areas are received in the through-openings.

12 Claims, 7 Drawing Sheets

(51) Int. Cl.
*F04D 13/06* (2006.01)
*F04D 29/18* (2006.01)
*F16B 25/00* (2006.01)
*H02K 21/16* (2006.01)

(56) References Cited

U.S. PATENT DOCUMENTS

| | | | |
|---|---|---|---|
| 4,795,931 A | 1/1989 | Sturm | |
| 6,099,190 A * | 8/2000 | Honobe | F16B 37/00 248/225.11 |
| 6,376,952 B1 | 4/2002 | Stenta | |
| 10,530,212 B2 | 1/2020 | Raguin et al. | |
| 10,760,572 B2 | 9/2020 | Takahashi | |
| 2009/0195116 A1 * | 8/2009 | Pong | H02K 15/16 310/270 |
| 2013/0052058 A1 * | 2/2013 | Motohashi | F01C 21/02 417/410.4 |
| 2015/0372557 A1 * | 12/2015 | Schuldt | F04D 29/40 310/67 R |
| 2016/0268875 A1 * | 9/2016 | Roos | H02K 5/10 |
| 2018/0026491 A1 * | 1/2018 | Raguin | H02K 5/15 310/418 |
| 2018/0138777 A1 | 5/2018 | Yokoyama | |
| 2018/0163721 A1 * | 6/2018 | Takahashi | H02K 21/16 |

FOREIGN PATENT DOCUMENTS

| | | |
|---|---|---|
| DE | 1553116 A1 | 7/1970 |
| DE | 3617989 A1 | 12/1987 |
| DE | 60009501 T2 | 2/2005 |
| DE | 102004012926 A1 | 10/2005 |
| DE | 112016002523 T5 | 3/2018 |
| FR | 3049129 A1 * | 9/2017 |
| JP | 2016226109 A | 12/2016 |
| JP | 2017002755 A | 1/2017 |

OTHER PUBLICATIONS

German search report for DE102018212145.1, Dated Feb. 25, 2021, Google Translation attached to original, All together 16 Pages.
Bruno Lotter Hans-Peter Wiendahl, Assembly in the industrial Production, A handbook for practice, 2nd edition 2012, Google Translation attached to original, All together 16 Pages.

* cited by examiner

ELECTRIC MOTOR AND PUMP COMPRISING SUCH AN ELECTRIC MOTOR

CROSS-REFERENCE TO RELATED APPLICATIONS

This application is the U.S. National Phase of PCT Application No. PCT/EP2019/067677 filed on Jul. 2, 2019, which claims priority to German Patent Application No. DE 10 2018 212 145.1, filed on Jul. 20, 2018, the disclosures of which are hereby incorporated in their entirety by reference herein.

TECHNICAL FIELD

The present disclosure relates to an electric motor, such as an electric motor for use in an oil pump.

BACKGROUND

Motor vehicles typically have an oil pump that conveys oil in an oil circuit. The oil pump in this case serves, for example, to control a vehicle transmission or to cool or lubricate components of a drive train. As an example, such an oil pump is driven by an electric motor, its electric motor having a function carrier to which the stator of the electric motor is fastened. The function carrier in this case comprises, for example, a set of control electronics or a rotational-speed sensor. Furthermore, the function carrier has, for example, a bearing seat for a shaft bearing for the shaft of the electric motor.

SUMMARY

The present disclosure may be based on a number of objectives such as providing a suitable electric motor configured for fixing and centering the stator on the function carrier.

The electric motor may be used for an oil pump, and may include a rotor, and a stator arranged on the outer circumference of the rotor. The stator, in turn, has (screw) lead-through apertures, which are continuous in the axial direction, for screw elements. The screw elements in this case serve to fasten the stator to a function carrier of the electric motor, the function carrier being arranged at an end face of the stator. Therein, the end face is the side that extends in a plane parallel to the axial direction of the electric motor. Therein, the function carrier is arranged at the end face of the stator opposite to the output side of the electric motor, which is also called the B-side, expediently.

The function carrier additionally has a contact contour for the stator, and has screw receivers for the screw elements. Therein, the screw receivers protrude in the axial direction out from the contact contour of the function carrier, toward the stator. The screw receivers thus protrude relative to contact contour in the axial direction. The screw receivers in this case are received in the lead-through apertures of the stator.

The screw receivers in this case fulfill a double function. On the one hand, they serve to hold the stator on the function carrier by means of the screw elements, on the other hand they serve to center and fix the stator in a designated position on the function carrier. According to an expedient development, two centering pairs are provided, the centering means of which are formed, respectively, by means of one of the screw receivers and by means of one of the lead-through apertures. The centering pairs are thus designed and configured for centering and fixing the function carrier on the stator. In addition, the centering means of one of the centering pairs, which is also called a first centering pair, have mutually corresponding circular cross-sections. As a result, only one rotational degree of freedom remains for the seating of the function carrier on the stator. In other words, the first centering pair forms a fixed bearing.

This rotational degree of freedom is cancelled out by means of the other (second) centering pair. For this purpose, one of the centering means of the second centering pair has a circular cross-section, and the other centering means of this second centering pair has a substantially rectangular, such as sword-shaped, oval or arc-shaped cross-section. The screw receiver is thus spaced, in a radial direction perpendicular to the axial direction, from the inner wall of the receiver formed by means of the lead-through aperture. In the circumferential direction, however, the screw receiver is seated on the inner wall of the lead-through aperture. Thus, the lead-through aperture forms a support for the screw receiver in the circumferential direction. The rotational degree of freedom with respect to the seating of the stator on the function carrier is thus cancelled out. In this way, therefore, a statically defined system is formed, the lead-through apertures and the screw receivers serving as centering means for centering the function carrier on the stator. The cutting plane for the respective cross-section in this case is oriented perpendicular to the axial direction of the electric motor.

In summary, the screw receivers form both a fastening means for the screw elements and a centering dome for centering and fixing the stator on the function carrier.

In a first variant of the electric motor, according to an expedient embodiment, both screw receivers have a circular cross-section. Forming a respective receiver for the screw receivers, one of the lead-through apertures is extended in the shape of a circle in a plane perpendicular to the axial direction, and the other (second) lead-through aperture is extended in this plane substantially in the shape of a rectangle, such as in an oval shape, arc shape or sword shape.

According to a second variant of the electric motor, the lead-through apertures each have a circular cross-section, the lead-through apertures being extended in the shape of a circle in a plane perpendicular to the axial direction to form a receiver for the screw receivers. Furthermore, for the purpose of centering the function carrier on the stator, the screw receivers each form a centering dome, one of which has a circular cross-section and the other a substantially rectangular, such as oval, arc-shaped or sword-shaped and, in the circumferential direction, elongate cross-section.

In both variants, however, a statically defined bearing system is formed, by means of two centering pairs that each have two centering means, the centering means each being formed by means of one of the lead-through apertures and one of the screw receivers.

In an expedient embodiment, the lead-through apertures are made in radial tabs of the stator laminated core. Expediently, they are arranged in this case on the outer side of the stator, facing away from the rotor, and opposite each other.

In an expedient design, the screw receivers are each formed by means of a threaded bushing having a corresponding cross-sectional shape. As an example, they are inserted in the function carrier during the production process by means of plastic encapsulation. The threaded bushings in this case partially protrude from the contact contour toward the stator. The threaded bushings are made of a metal, such that the screw receivers are advantageously comparatively robust against a load. In addition, the corresponding cross-sectional shape of the respective screw receiver can be easily realized by a suitable choice of threaded bushing. Since the threaded bushings are made of metal, the scraping-off of plastic particles during assembly, mentioned at the outset, is also advantageously prevented.

In another embodiment, a pump, which may be designed and configured as an oil pump for a motor vehicle, has an electric motor in one of the variants described above. As an example, its function carrier thus has screw receivers that project in the axial direction in relation to the contact contour for the stator and that are received in the lead-through apertures of the stator.

BRIEF DESCRIPTION OF THE DRAWINGS

The invention is explained in greater detail in the following on the basis of a drawing. There are shown.

Figure 1:
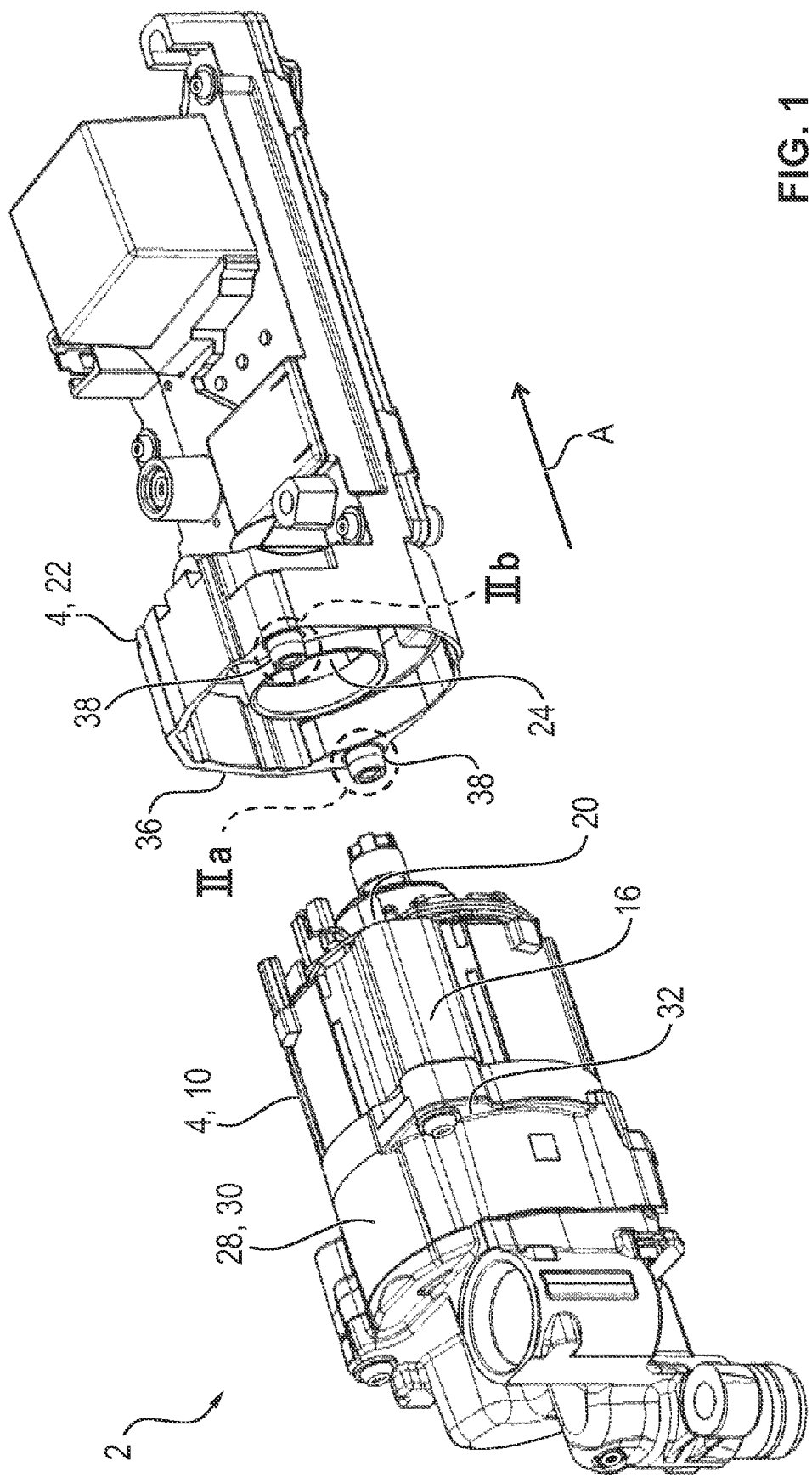
FIG. 1 shows a perspective, exploded representation of a pump comprising a function carrier and comprising an electric motor that has a stator, the function carrier being arranged at an end face of the stator, and the function carrier having screw receivers projecting axially in relation to a contact surface for the stator.

In all figures, parts and sizes that correspond to each other are in each case denoted by the same references.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A function carrier may be arranged at end face of the stator with respect to the motor axis, such as on the B-side. The stator is fastened to the function carrier by means of, for example, screw elements that are inserted into (continuous) lead-through apertures of the stator that extend in the axial direction. For the purpose of fixing and centering the stator on the function carrier, in this case there are provided on the function carrier, for example, (centering) domes that extend in the axial direction toward the stator and that are received in hole-type receivers, provided in the stator, which correspond to these domes. Such domes in this case are typically formed by means of a plastic, and in particular are injection-molded onto the function carrier.

However, such domes have a comparatively low strength. Thus, they can break off from the function carrier under load, such that the stator is held in an insufficiently defined position on the function carrier. Moreover, during assembly, plastic particles may be scraped off on the laminated core of the stator.

FIGS. 1 to 4 show a pump 2, realized as an oil pump for a motor vehicle, not represented further, having a first variant of an electric motor 4. The electric motor 4 comprises a rotatably mounted rotor 6, which is driven in rotation about a rotation axis, which extends in the axial direction A, when a stator winding 8 of stator 10 is appropriately energized. The stator 10 in this case is arranged radially outside the rotor 6. In other words, the electric motor 4 is realized as a so-called internal rotor.

The stator 10 has two radial tabs 16 formed by its laminated core 14, which are arranged opposite each other on the outer side of the stator 10 that faces away from the rotor 6. Made in each of the radial tabs 16 of the laminated core 14 there is a leadthrough 18 that extends continuously in the axial direction A. Received in each of the lead-through apertures 18 there is a screw element 20, by means of which the stator 10 is fastened to a function carrier 22. The function carrier 22 comprises a set of electronics, not represented further, and a rotational-speed sensor for controlling the electric motor 4. Furthermore, the function carrier 22 has a shaft bearing seat 24 for the shaft 26 of the electric motor 4.

The pump 2 additionally comprises a pump module 28, the pump housing 30 of which is provided with two flanges 32, the flange lead-through apertures of which align with the lead-through apertures 18 of the stator 10 for the purpose of receiving the screw elements 20, and thus to hold the pump housing 30 on the stator 10. In addition, the pump module 28 has pumping means (conveying means) for conveying oil, which are not shown further.

The function carrier 22 is arranged at an end face 34 with respect to the axial direction A of the stator 10. The function carrier 22 has a contact contour 36 for the stator 10 that projects in the axial direction A toward the stator 10. The function carrier 22 additionally has two screw receivers 38 for the screw elements 20. These protrude in the axial direction A from radial tabs 39 of the contact contour 36, in the axial direction toward the stator 10. In the assembled state, the screw receivers 38 in this case are received in the lead-through apertures 18 of the stator 10.

Figure 2A:
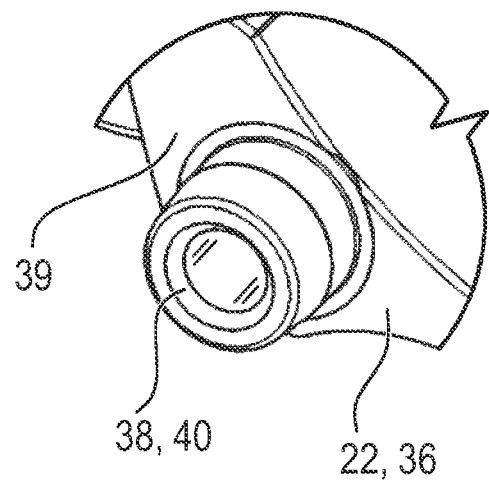
FIG. 2a and FIG. 2b show a perspective view of the regions IIa and IIb of FIG. 1, in enlarged scale.
Figure 2B:
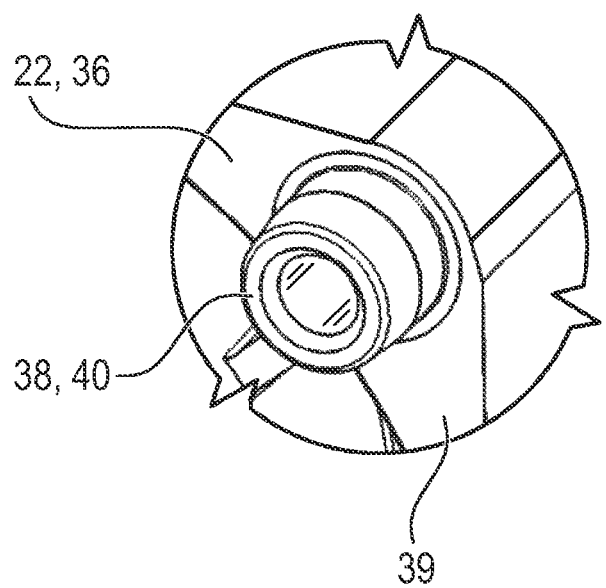
Figure 3:
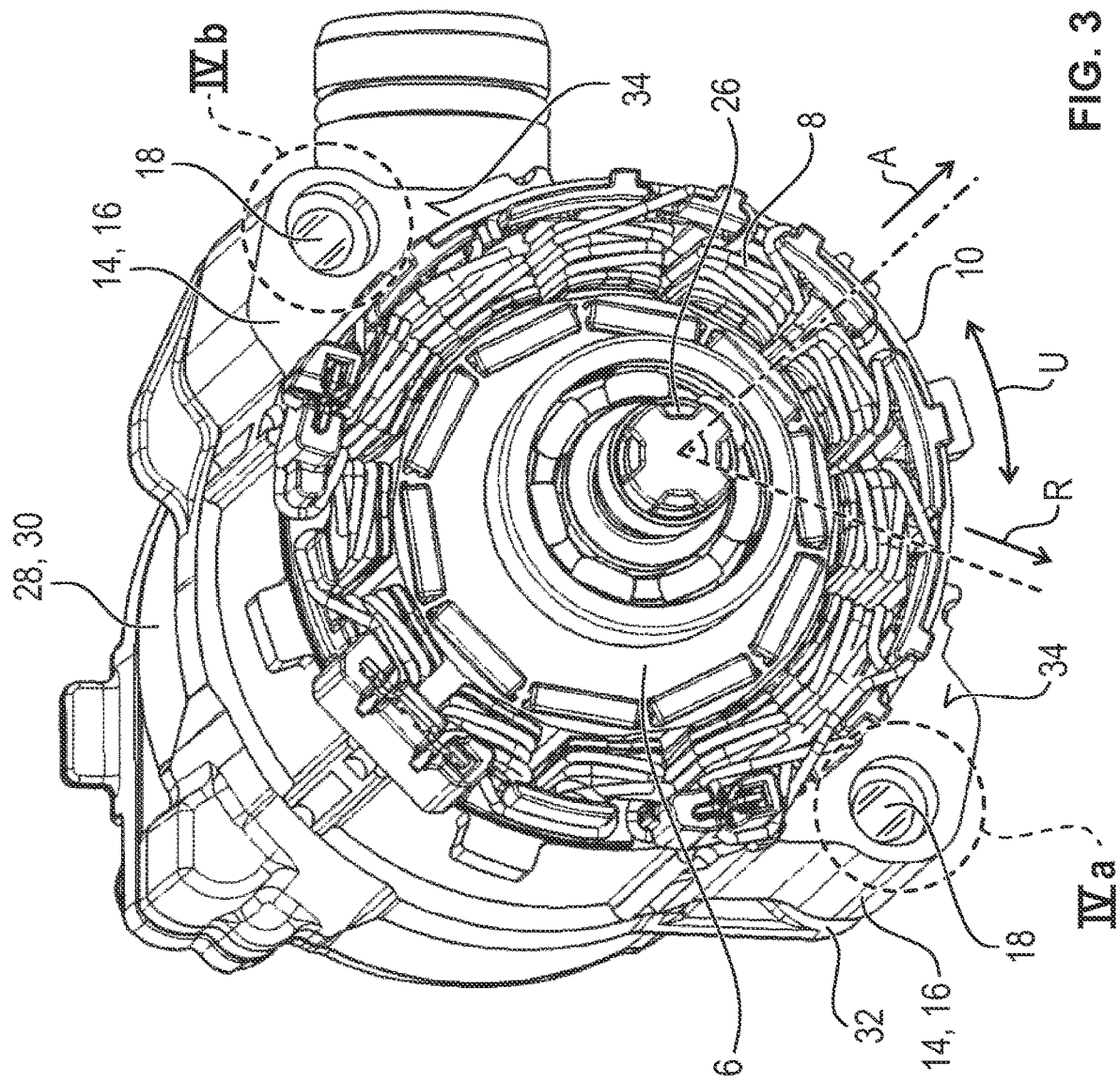
FIG. 3 shows a perspective view of the rotor and the stator, the stator having on the outside screw lead-through apertures that are continuous in the axial direction and that are extended in a circular or sword shape at the end that faces toward the function carrier.
Figure 4A:
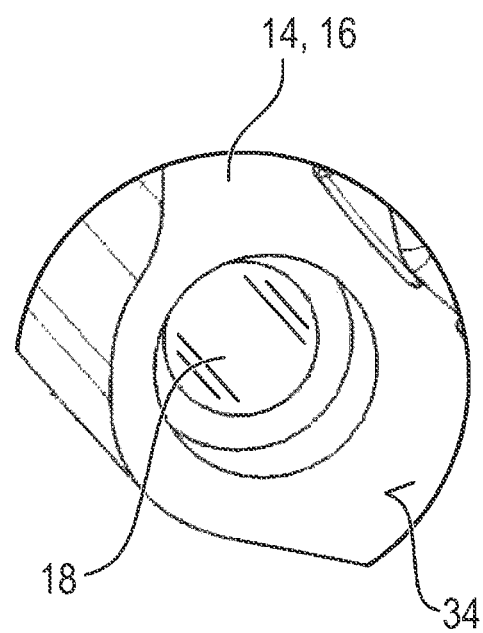
FIG. 4a and FIG. 4b show a perspective view of the regions IVa and IVb of FIG. 3, in enlarged scale.
Figure 4B:
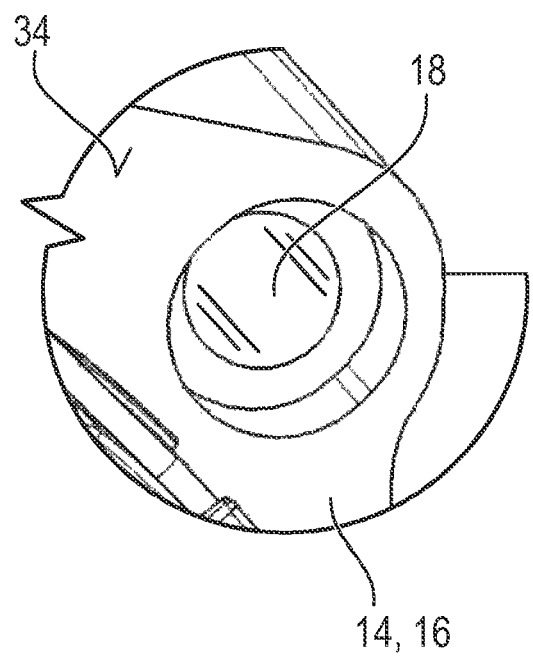

As shown in enlarged scale in FIGS. 2a and 2b, the screw receivers 38 are realized as threaded bushings 40. They are made in the function carrier 22 by means of plastic encapsulation, the threaded bushings 40 partially protruding perpendicularly from the contact contour 36, forming so-called centering domes. The screw receivers 38 in this case have a circular cross-section in a plane perpendicular to the axial direction A. The screw receiver 38 is thus realized as a threaded bushing 40 having a circular cross-section.

The two lead-through apertures 18 are also extended in a plane perpendicular to the axial direction, forming a respective receiver for the screw receivers 38. One of the lead-through apertures 18 in this case is extended in the shape of a circle in this plane, such that this lead-through aperture 18 and one of the screw receivers 38 have mutually corresponding contours. This lead-through aperture 18 and the corresponding screw receiver 38 in this case each form a centering means of a first centering pair, by means of which there remains only a rotational degree of freedom of the stator 10 with respect to the function carrier 22.

The other lead-through aperture 18 is extended in an oval shape, i.e. substantially rectangular in shape, in a plane perpendicular to the axial direction. The plates forming the laminated core 14, where the lead-through apertures 18 are extended, are therefore not axially symmetrical with respect to the rotation axis of the rotor 6.

The lead-through aperture 18 is elongate in the radial direction R, i.e. perpendicular to the axial direction A. This allows the screw receiver 38 received in the lead-through aperture 18 to be moved for adjustment in the radial direction R, but prevents it from rotating in the circumferential direction U. Thus, in the case of this centering pair, a distance in the radial direction R is formed between the screw receiver 38 and the inner wall of the lead-through aperture 18, the screw receiver 38 being seated on the inner wall of the lead-through aperture 18 in the circumferential direction U. In other words, the lead-through aperture 18 forms a support for the screw receivers in the circumferential direction U.

The first centering pair and the second centering pair, formed by means of the lead-through aperture 18 extended in the shape of an oval and by means of the corresponding screw receiver 38, thus form a (statically) defined (bearing) system.

The lead-through apertures 18 in this case are extended only at their end that faces toward the function carrier 22. Consequently, a play, i.e. a movement in a plane perpendicular to the axial direction A, of the screw elements 20 received in the lead-through apertures 18 is reduced.

Figure 5:
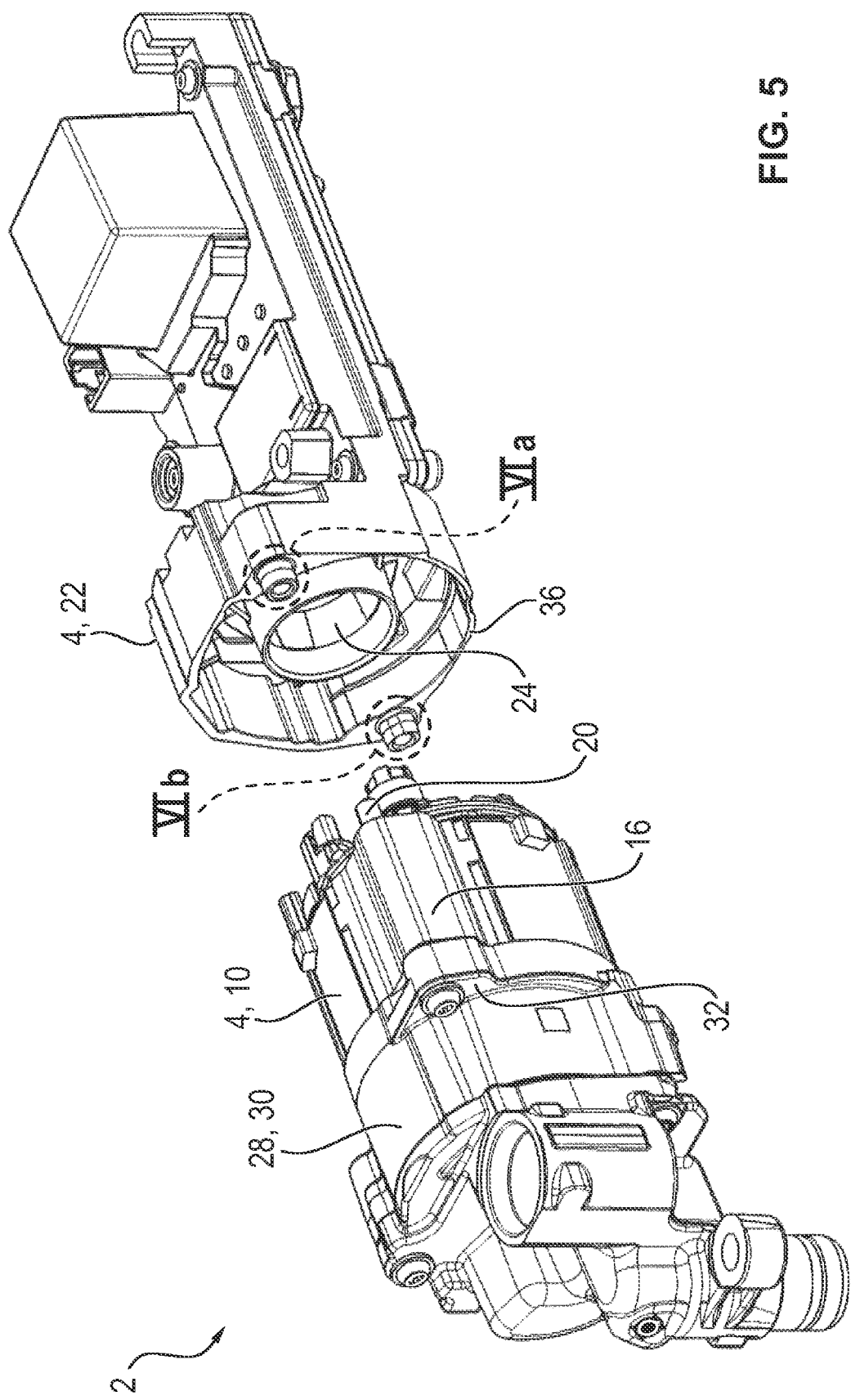
FIG. 5 shows a perspective view of the pump with an alternative design of its electric motor, the screw receivers that project in relation to the supporting surface having a circular or sword-shaped cross-section.
Figure 6A:
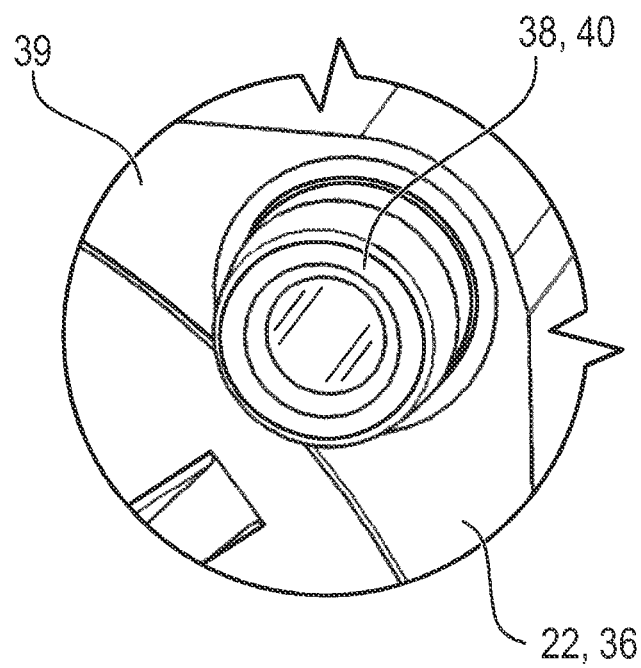
FIG. 6a and FIG. 6b show a perspective view of the regions VIa and VIb of FIG. 5, in enlarged scale.
Figure 6B:
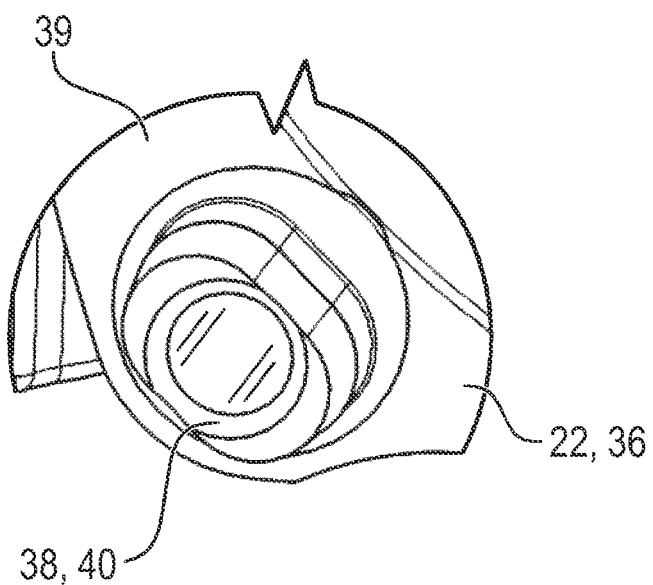
Figure 7:
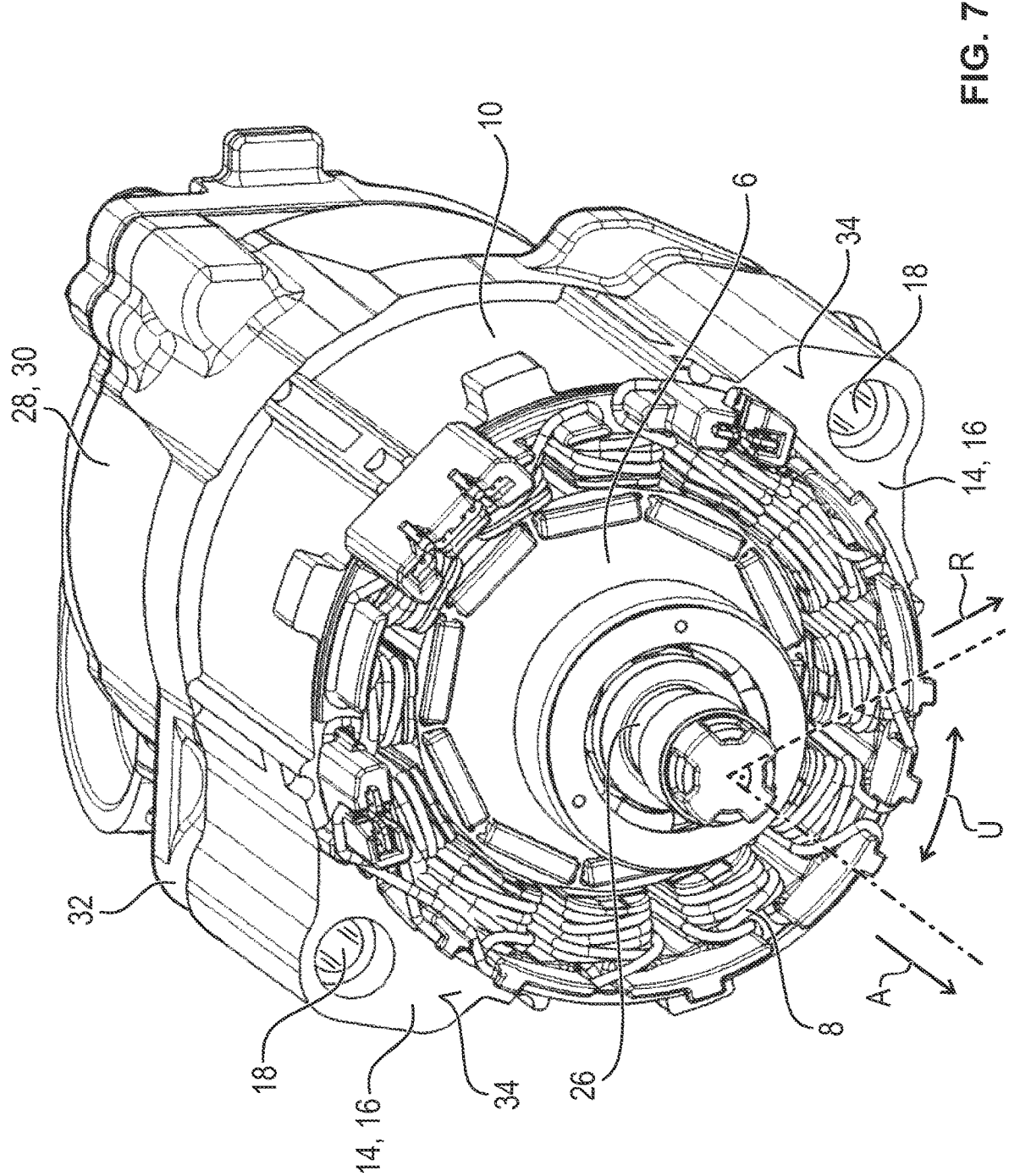
FIG. 7 shows a perspective view of the rotor and the stator of the alternative design of the electric motor, the screw lead-through apertures arranged in the stator being extended in the shape of a circle at their end that faces toward the function carrier.

FIGS. 5 to 7 show the pump 2 with an alternative design of electric motor 4. With the exception of that which is described below, the pump 2 is similar in design to the variant shown in FIGS. 1 to 4, such these features are not described further. According to this second variant of the electric motor 4, both lead-through apertures 18 are extended in the shape of a circle at their end that faces toward the function carrier 22, forming a corresponding receiver for the screw receivers 38. The lead-through apertures 18 thus have a circular cross-section there.

For the purpose of centering the function carrier 22 on the stator 10, one of the screw receivers 38 has a circular cross-section in a plane perpendicular to the axial direction A, and the other screw receiver has a substantially oval, i.e. such as rectangular, cross-section in this plane. The respective centering dome is thus formed by means of a threaded bushing 40 that has a circular cross-section, or by means of a threaded bushing that has a substantially oval, i.e. rectangular, cross-section. In other words, the outer circumference of the cross-section of the threaded bushing is circular or rectangular, respectively. Similarly, a statically defined bearing system is thereby formed by means of two centering pairs that each have two centering means, the centering means being formed by means of one of the lead-through apertures 18 and one of the screw receivers 38.

In summary, for both variants, the screw receivers 38 form both a fastening means, for the screw elements 30, and the centering dome. The screw receivers 38 therefore have a double function.

Further in summary, two centering pairs, each having two centering means, are provided and configured for centering the function carrier 22 on the stator 10. The two centering means in this case are formed by means of one of the screw receivers 38 and by means of one of the lead-through apertures 18. In this case the centering means of one of the centering pairs have mutually corresponding circular cross-sections, such that only a rotational degree of freedom remains for the seating of the function carrier 22 on the stator 10. In other words, a fixed bearing is formed. This rotational degree of freedom is cancelled out by means of the other (second) centering pair. For this purpose, one of these centering means of the second centering pair has a circular cross-section, and the other centering means of this centering pair has a substantially rectangular, such as oval, cross-section, the screw receiver 38 being spaced in the radial direction R from the inner wall of the receiver formed by means of the lead-through aperture 18. In the circumferential direction U, however, the screw receiver 38 is seated on the inner wall of the lead-through aperture 18.

The invention is not limited to the exemplary embodiments described above. Rather, other variants of the invention may be derived from it by person skilled in the art, without departure from the subject-matter of the invention. Moreover, as an example, all individual features described in connection with the exemplary embodiments may also be combined with each other in other manner without departure from the subject-matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCES 2 pump
4 electric motor
6 rotor
8 stator winding
10 stator
14 laminated core
16 radial tab
18 lead-through aperture
20 screw elements
22 function carrier
24 shaft bearing seat
26 shaft
28 pump module
30 pump housing
32 flange
34 end face
36 contact contour
38 screw receiver
39 radial tabs of the contact contour
40 threaded bushing
A axial direction
R radial direction
U circumferential direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electric motor for use in an oil pump, the electric motor comprising:

a rotor;
a stator defining a number of lead-through apertures each continuously extending along an axial direction and forming an end face arranged with respect to the axial direction;
a number of screw elements; and
a function carrier disposed on the end face, defining a number of screw receivers each extending along the axial direction, and provided with a contact contour configured to engage the stator, wherein the number of lead-through apertures receive the number of screw receivers and the number of screw receivers receive the number of screw elements; and
a first and second centering pair, provided for centering the function carrier on the stator, the first centering pair having a first lead-through aperture of the number of lead-through apertures and a first screw receiver of the number of screw receivers, the second centering pair having a second lead-through aperture of the number of lead-through apertures and a second screw receiver of the number of screw receivers;
wherein the first screw receiver and the first lead-through aperture have mutually corresponding circular cross-sections, wherein one of the second lead-through aperture and the second screw receiver has a circular cross-section, and the other of the second lead-through aperture and the second screw receiver has a substantially rectangular, oval, arc-shaped or sword-shaped cross-section, and wherein the second screw receiver is spaced in a radial direction perpendicular to the axial direction from an inner wall of the second lead-through aperture and is seated on the inner wall of the second lead-through aperture in a circumferential direction.

2. The electric motor of claim 1, wherein the number of lead-through apertures each have a circular cross-section and each of the screw receivers of the number of screw receivers each include a centering dome configured to center the function carrier with respect to the stator.

3. The electric motor of claim 1, wherein the stator is formed by a laminated core including a number of radial tabs and defining the number of lead-through apertures.

4. The electric motor of claim 1, wherein the number of screw receivers are formed by threaded bushings inserted into the function carrier.

5. An oil pump for use in a motor vehicle, the oil pump comprising:
a rotor;
a stator defining a number of lead-through apertures each continuously extending along an axial direction and forming an end face arranged with respect to the axial direction;
a number of screw elements; and
a function carrier disposed on the end face, defining a number of screw receivers each extending along the axial direction, and provided with a contact contour configured to engage the stator, wherein the number of lead-through apertures receive the number of screw receivers and the number of screw receivers receive the number of screw elements; and
a first and second centering pair, provided for centering the function carrier on the stator, the first centering pair having a first lead-through aperture of the number of lead-through apertures and a first screw receiver of the number of screw receivers, the second centering pair having a second lead-through aperture of the number of lead-through apertures and a second screw receiver of the number of screw receivers;
wherein the first screw receiver and the first lead-through aperture have mutually corresponding circular cross-sections, wherein one of the second lead-through aperture and the second screw receiver has a circular cross-section, and the other of the second lead-through aperture and the second screw receiver has a substantially rectangular, oval, arc-shaped or sword-shaped cross-section, and wherein the second screw receiver is spaced in a radial direction perpendicular to the axial direction from an inner wall of the second lead-through aperture and is seated on the inner wall of the second lead-through aperture in a circumferential direction.

6. An oil pump for use in a vehicle, the oil pump comprising:
a stator formed by a plurality of laminations collectively defining a number of lead-through apertures;
a rotor disposed within an inner periphery of the stator;
a function carrier including a contact contour configured to engage the stator;
a number of threaded bushings axially extending from the function carrier; and
a number of fasteners, wherein the number of lead-through apertures and the number of threaded bushings are arranged to receive the number of fasteners; and
a first and second centering pair, provided for centering the function carrier on the stator, the first centering pair having a first lead-through aperture of the number of lead-through apertures and a first threaded brushing of the number of threaded bushings, the second centering pair having a second lead-through aperture of the number of lead-through apertures and a second threaded brushing of the number of threaded brushings;
wherein the first threaded brushing and the first lead-through aperture have mutually corresponding circular cross-sections, wherein one of the second lead-through aperture and the second threaded brushing has a circular cross-section, and the other of the second lead-through aperture and the second threaded brushing has a substantially rectangular, oval, arc-shaped or sword-shaped cross-section, and wherein the second threaded brushing is spaced in a radial direction perpendicular to an axial direction from an inner wall of the second lead-through aperture and is seated on the inner wall of the second lead-through aperture in a circumferential direction.

7. The oil pump of claim 6, wherein the contact contour includes an inner periphery and the stator includes an outer periphery and wherein at least portions of the inner periphery of the contact contour lies along at least portions of the outer periphery of the stator.

8. The oil pump of claim 7, wherein the contact contour includes a number of radial tabs extending radially inward and the number of threaded bushings extend from the number of radial tabs.

9. The oil pump of claim 8, wherein the first threaded bushing of the number of threaded bushings extends from a first radial tab of the number of radial tabs.

10. The oil pump of claim 9, wherein a second radial tab of the number of radial tabs is disposed diagonally opposite from the first radial tab.

11. The oil pump of claim 6, wherein the stator includes an end face and the number of lead-through apertures are formed by a number of counter-bore holes defined by the end face.

12. The oil pump of claim 6, wherein the number of lead-through apertures are configured to receive the number of threaded bushings.

* * * * *